US009614394B2

(12) United States Patent
Nakadai

(10) Patent No.: US 9,614,394 B2
(45) Date of Patent: Apr. 4, 2017

(54) VEHICLE-MOUNTED CHARGING DEVICE, AND VEHICLE MOUNTED WITH SAME

(71) Applicant: Panasonic Corporation, Osaka (JP)

(72) Inventor: Junichi Nakadai, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 183 days.

(21) Appl. No.: 14/379,759

(22) PCT Filed: Feb. 21, 2013

(86) PCT No.: PCT/JP2013/001002
§ 371 (c)(1),
(2) Date: Aug. 20, 2014

(87) PCT Pub. No.: WO2013/125236
PCT Pub. Date: Aug. 29, 2013

(65) Prior Publication Data
US 2015/0042272 A1 Feb. 12, 2015

(30) Foreign Application Priority Data
Feb. 23, 2012 (JP) ................. 2012-037101

(51) Int. Cl.
H02J 7/00 (2006.01)
H02J 7/02 (2016.01)
(Continued)

(52) U.S. Cl.
CPC .............. *H02J 7/025* (2013.01); *H02J 5/005* (2013.01); *H02J 7/0052* (2013.01); *H01M 10/46* (2013.01)

(58) Field of Classification Search
USPC ................ 320/150, 108, 107, 137, 109, 155
See application file for complete search history.

(56) References Cited

U.S. PATENT DOCUMENTS

2005/0007067 A1* 1/2005 Baarman ................... H01F 5/02
320/108
2005/0068019 A1* 3/2005 Nakamura ................ G06F 1/26
323/355
(Continued)

FOREIGN PATENT DOCUMENTS

CA 2 748 371 7/2010
CN 1604426 4/2005
(Continued)

OTHER PUBLICATIONS

International Search Report issued May 14, 2013 in International (PCT) Application No. PCT/JP2013/001002.
(Continued)

Primary Examiner — Brian Ngo
(74) Attorney, Agent, or Firm — Wenderoth, Lind & Ponack, L.L.P.

(57) ABSTRACT

A vehicle-mounted charging device which begins to charge at an appropriate timing when driving a vehicle. A driver sets the travel distance at which charging begins while charging coil (10) and charging coil (13) are magnetically coupled, then a charge control unit (12) drives a drive circuit (11) once the travel distance of the vehicle becomes equal to or greater than the set value. The drive circuit (11) excites charging coil (10) and supplies power from charging coil (10) by changing the magnetic flux generated by charging coil (10). As a consequence, a portable device (7) begins to be charged.

5 Claims, 8 Drawing Sheets

(51) Int. Cl.
*H02J 5/00* (2016.01)
*H01M 10/46* (2006.01)

(56) References Cited

U.S. PATENT DOCUMENTS

| | | | |
|---|---|---|---|
| 2005/0173523 A1* | 8/2005 | Yushio | F01N 11/00 235/384 |
| 2008/0001572 A9 | 1/2008 | Baarman et al. | |
| 2010/0264871 A1 | 10/2010 | Matouka et al. | |
| 2012/0206099 A1* | 8/2012 | Ichikawa | B60L 11/1838 320/109 |
| 2012/0326655 A1* | 12/2012 | Nomura | H02J 7/044 320/107 |
| 2014/0103865 A1* | 4/2014 | Van Wiemeersch | H02J 17/00 320/108 |

FOREIGN PATENT DOCUMENTS

| | | |
|---|---|---|
| CN | 101044664 | 9/2007 |
| JP | 2008-503196 | 1/2008 |
| JP | 2008-259256 | 10/2008 |
| JP | 2009-148108 | 7/2009 |
| JP | 2011-087346 | 4/2011 |

OTHER PUBLICATIONS

English translation of Search Report which is an annex to Office Action dated Jan. 21, 2016 in corresponding Chinese patent application No. 2013800090675.

Extended European Search Report issued Jun. 16, 2015 in corresponding European Application No. 13752331.2.

\* cited by examiner

VEHICLE-MOUNTED CHARGING DEVICE, AND VEHICLE MOUNTED WITH SAME

BACKGROUND OF THE INVENTION

1. Technical Field

The present invention relates to a vehicle-mounted charging apparatus and a vehicle including the same.

2. Description of the Related Art

In mobile devices such as mobile phones, enhancement of their functional features dramatically increases their power consumption. For this reason, the mobile devices today sometimes run out of battery while the users of mobile devices are out.

In this respect, an attempt has been made to install charging apparatuses for mobile devices at various places. Japanese Patent Application Laid-Open No. 2011-87346, for example, discloses installing the charging apparatuses at homes, places of work, and restaurants.

The charging apparatuses installed at such places are ones that are so called non-contact type charging apparatuses. These charging apparatuses each include: a charging coil used for charging a mobile device; a drive circuit connected to this charging coil; and a charge control section connected to the drive circuit.

SUMMARY OF THE INVENTION

1. Technical Problem

A feature of the invention disclosed in JP 2011-87346 is that the conditions to start charging are set individually for the respective places where the charging apparatuses are installed, in such a way that charging starts immediately at homes; charging starts at places of work when the remaining battery level decreases to less than 80%; and charging starts at restaurants when the remaining battery level decreases to less than 50%.

Stated differently, frequent charging deteriorates the batteries of mobile devices quickly, so that JP 2011-87346 employs the configuration in which charging starts as needed so as to avoid an increase in the number of times of charging.

In a case where the charging apparatus disclosed in JP 2011-87346 is mounted in a vehicle, charging starts when the remaining battery level decreases to less than a predetermined percent. Accordingly, application of the technique disclosed in JP 2011-87346 1 to vehicles cannot necessarily avoid an increase in the number of times of charging, however, because the moving distance of vehicles varies (e.g., a short distance to a long distance).

In the case of going out for shopping to a nearby store (during a short distance move), for example, charging stops immediately when the driver lifts up the mobile device placed on the charging apparatus, upon arrival at the store, although the charging has just started at the start of moving of the vehicle. Even worse, charging starts again on the way back to home from the store, and the charging stops again upon arrival at home.

In the situation mentioned above, not only the battery of the mobile device is charged frequently, it is barely charged in reality.

It is an object of the present invention to provide a vehicle-mounted charging apparatus and a vehicle including the same, the apparatus being configured to start charging at an appropriate timing to avoid an increase in the number of times of charging during driving of a vehicle, and thus making it possible to avoid deterioration of batteries of mobile devices.

2. Solution to the Problem

A vehicle-mounted charging apparatus according to an aspect of the present invention includes: a charging coil that is used for charging a mobile device; a drive circuit that is connected to the charging coil and that is driven to supply power to the mobile device via the charging coil; a charge control section that is connected to the drive circuit and that controls a timing to start driving the drive circuit; and a charge-start setting section that is connected to the charge control section and that sets a distance at which charging starts, in which the charge control section drives the drive circuit after a vehicle runs a running distance in a state where the charging coil and the mobile device are magnetically coupled, the running distance being set by the charge-start setting section.

3. Advantageous Effects of the Invention

According to the present invention, the configuration in which charging starts after a vehicle runs a running distance that is set by the driver is adopted, so that it is made possible to start charging at an appropriate timing during driving of the vehicle.

Stated differently, according to the present invention, there is no deterioration of batteries, which would otherwise occur due to unnecessary charging, and it is possible to start charging at an appropriate timing in accordance with the moving distance.

DETAILED DESCRIPTION OF THE INVENTION

Hereinafter, an embodiment of the present invention will be described with reference to the accompanying drawings.

Figure 1:
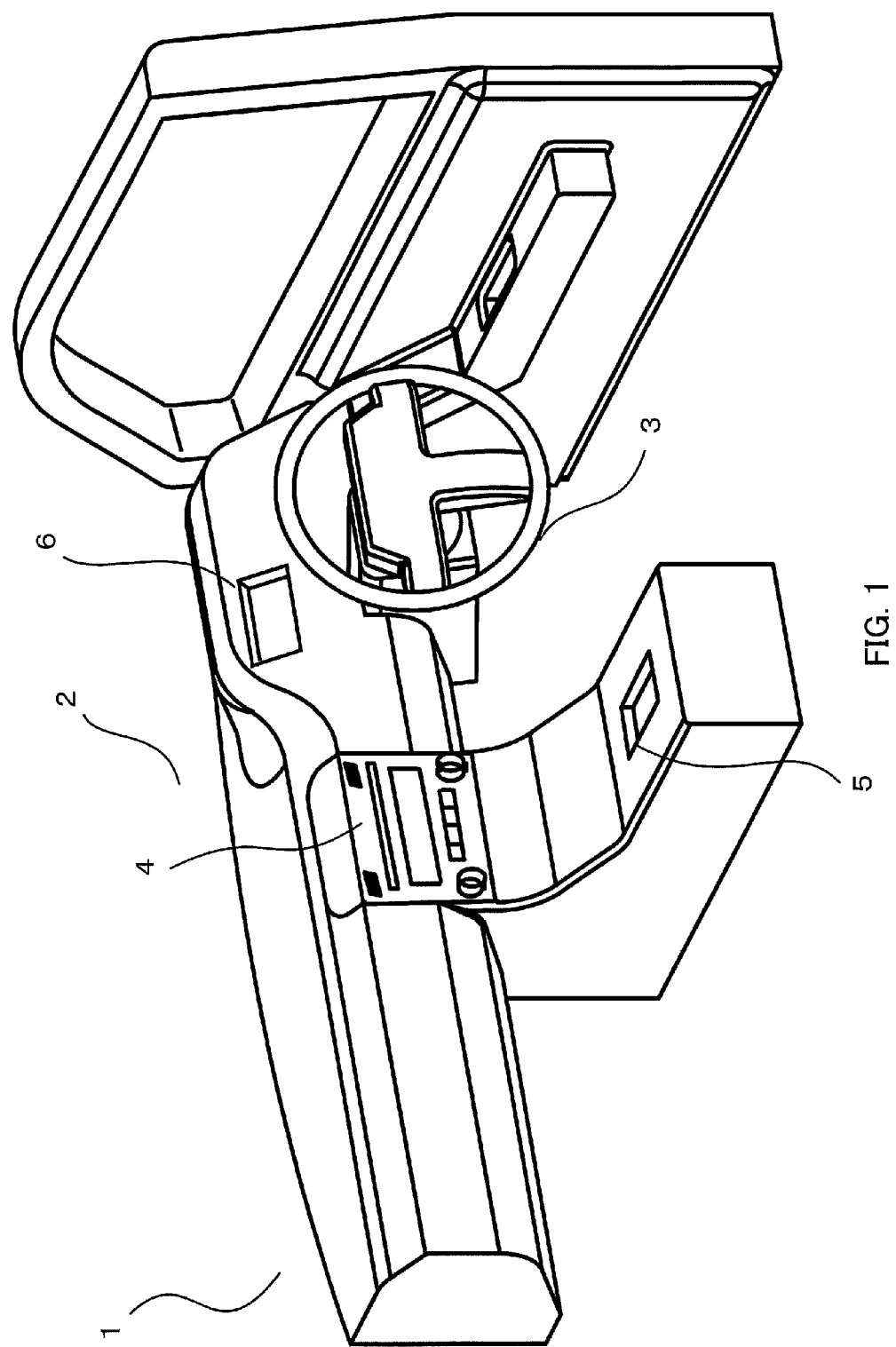
FIG. 1 is a perspective view of a vehicle-mounted charging apparatus according to an embodiment of the present invention.

As illustrated in FIG. 1, a steering wheel 3 is provided in the front part of vehicle interior 2 of vehicle 1.

An electronic device 4 for audio is provided in the lateral direction of steering wheel 3. A vehicle-mounted charging apparatus 5 is provided in the rear-downward direction of electronic device 4. A display 6 is provided in the forward direction of steering wheel 3. The vehicle-mounted charging apparatus 5 and display 6 are connected together via electric wiring.

Figure 2:
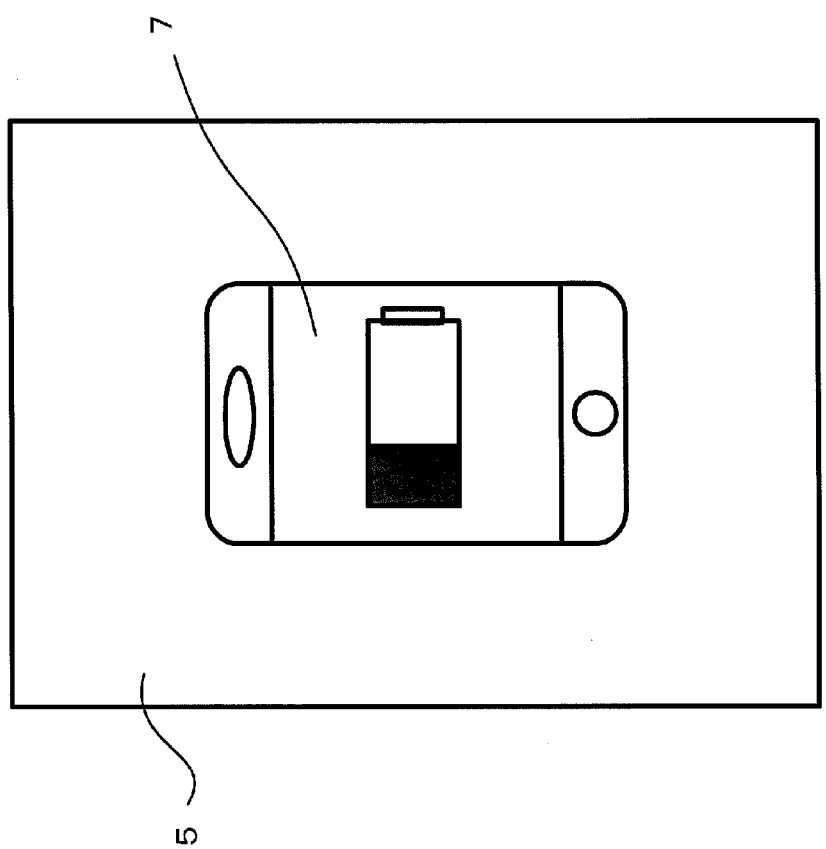
FIG. 2 is a plan view of a vehicle-mounted charging apparatus according to an embodiment of the present invention.
Figure 3:
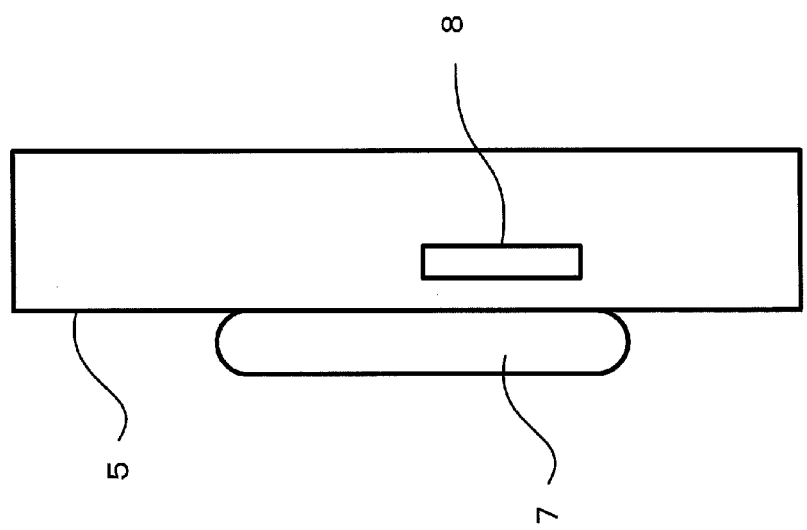
FIG. 3 is a side view of a vehicle-mounted charging apparatus according to an embodiment of the present invention.

As illustrated in FIGS. 2 and 3, when mobile device (e.g., mobile phone) 7 is placed on an upper surface of vehicle-mounted charging apparatus 5, the vehicle-mounted charging apparatus 5 detects mobile device 7 and starts charging the battery of mobile device 7 (i.e., rechargeable battery 9 in FIG. 4) using magnetic flux from charging coil 8.

Figure 4:
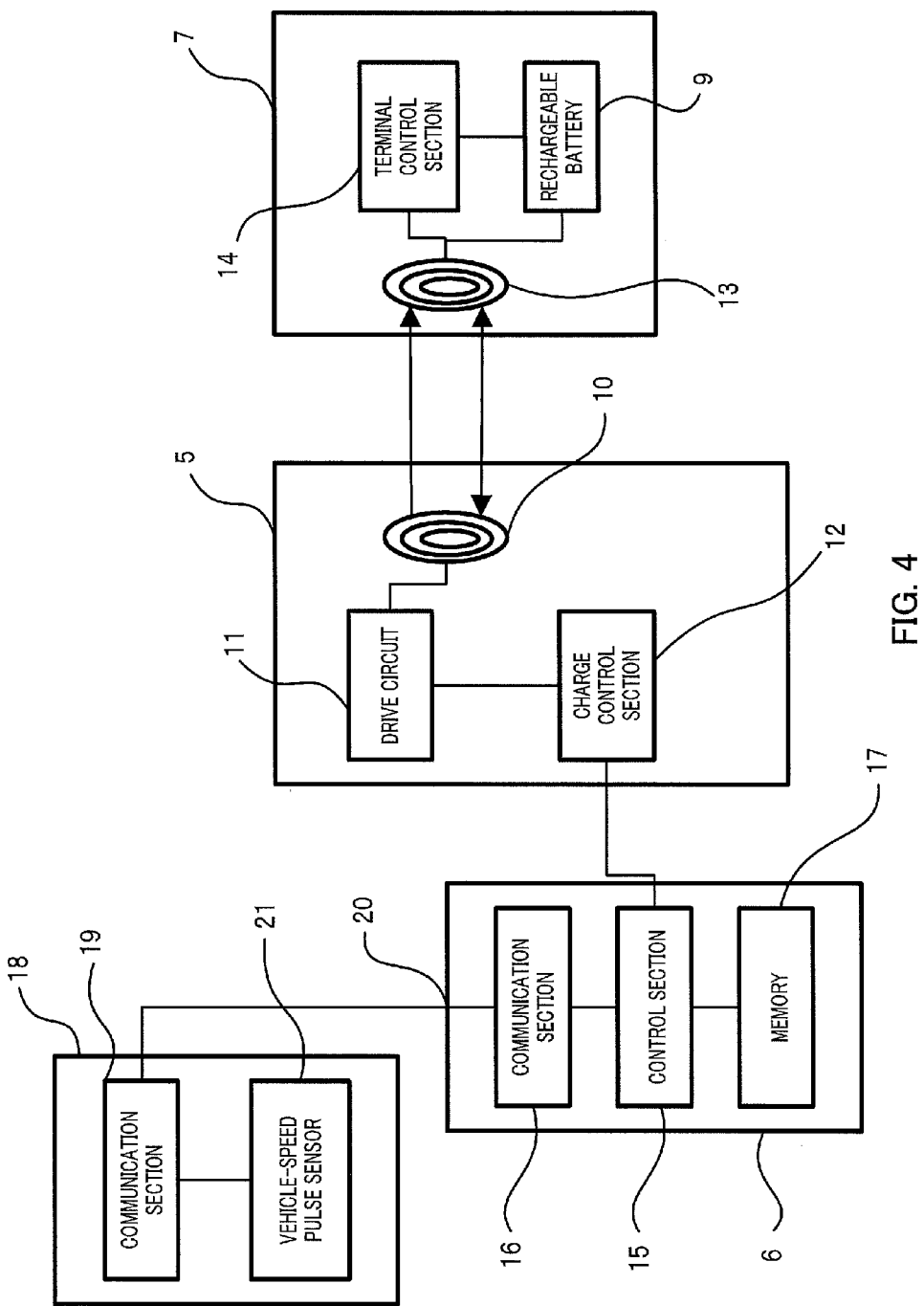
FIG. 4 is a control block diagram of a vehicle-mounted charging apparatus according to an embodiment of the present invention.

As illustrated in FIG. 4, the vehicle-mounted charging apparatus 5 includes a charging coil 10 used for charging mobile device 7, drive circuit 11 connected to charging coil 10, and charge control section 12 connected to drive circuit 11. The charge control section 12 is connected to control section 15 of display 6.

The mobile device 7 includes rechargeable battery 9, charging coil 13, and terminal control section 14.

The display 6 includes: control section 15 connected to charge control section 12; communication section 16 connected to control section 15; and memory 17 connected to control section 15.

The communication section 16 of display 6 is provided with connection terminal 20 connected to communication section (i.e., an example of vehicle running distance informing means) 19 of vehicle electronic control unit (ECU) 18. The running distance of vehicle 1 is calculated based on an output of the vehicle-speed pulse sensor 21. Data indicating the running distance obtained by the calculation is transmitted to charge control section 12 of vehicle-mounted charging apparatus 5 via communication section 19, connection terminal 20, communication section 16 of display 6, and control section 15.

In the configuration described above, when mobile device 7 is placed on the upper surface of vehicle-mounted charging apparatus 5 as illustrated in FIGS. 2 and 3, charging coil 10 and charging coil 13 illustrated in FIG. 4 are magnetically coupled.

Figure 5:
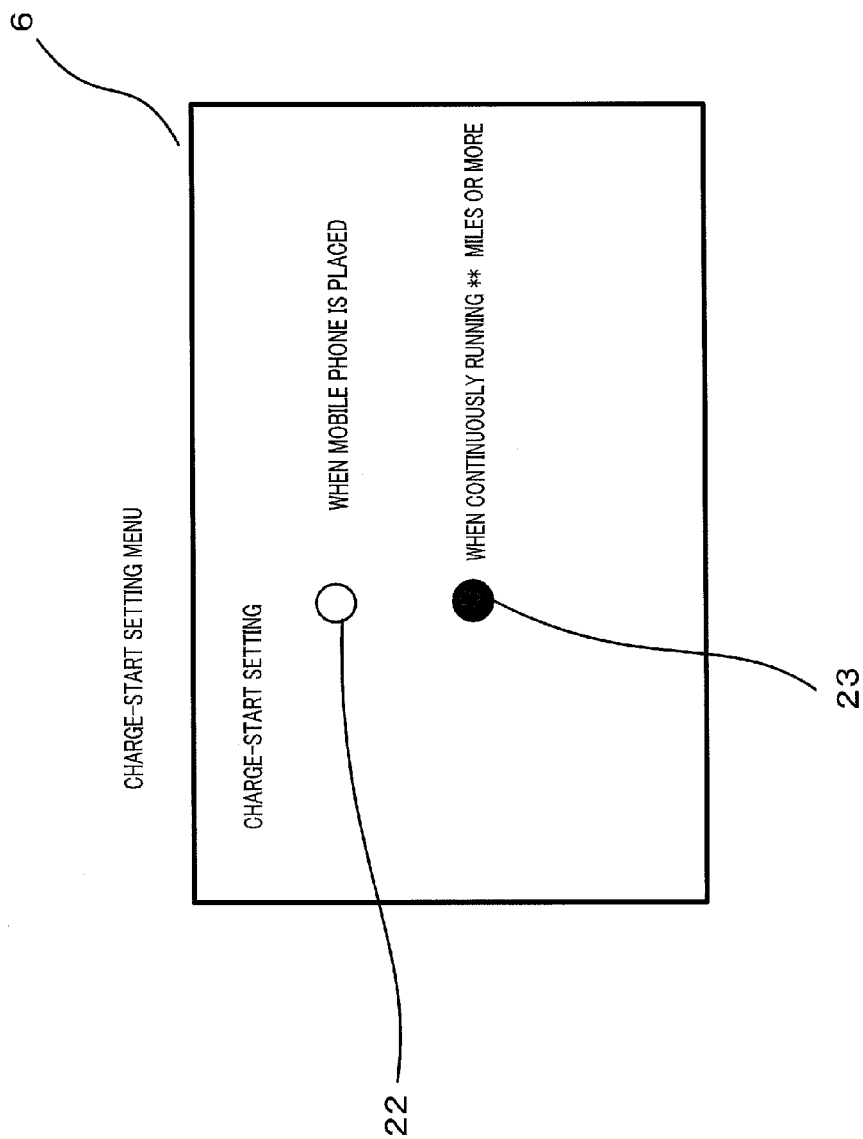
FIG. 5 is a diagram illustrating display contents of a display of a vehicle-mounted charging apparatus according to an embodiment of the present invention.
Figure 8:
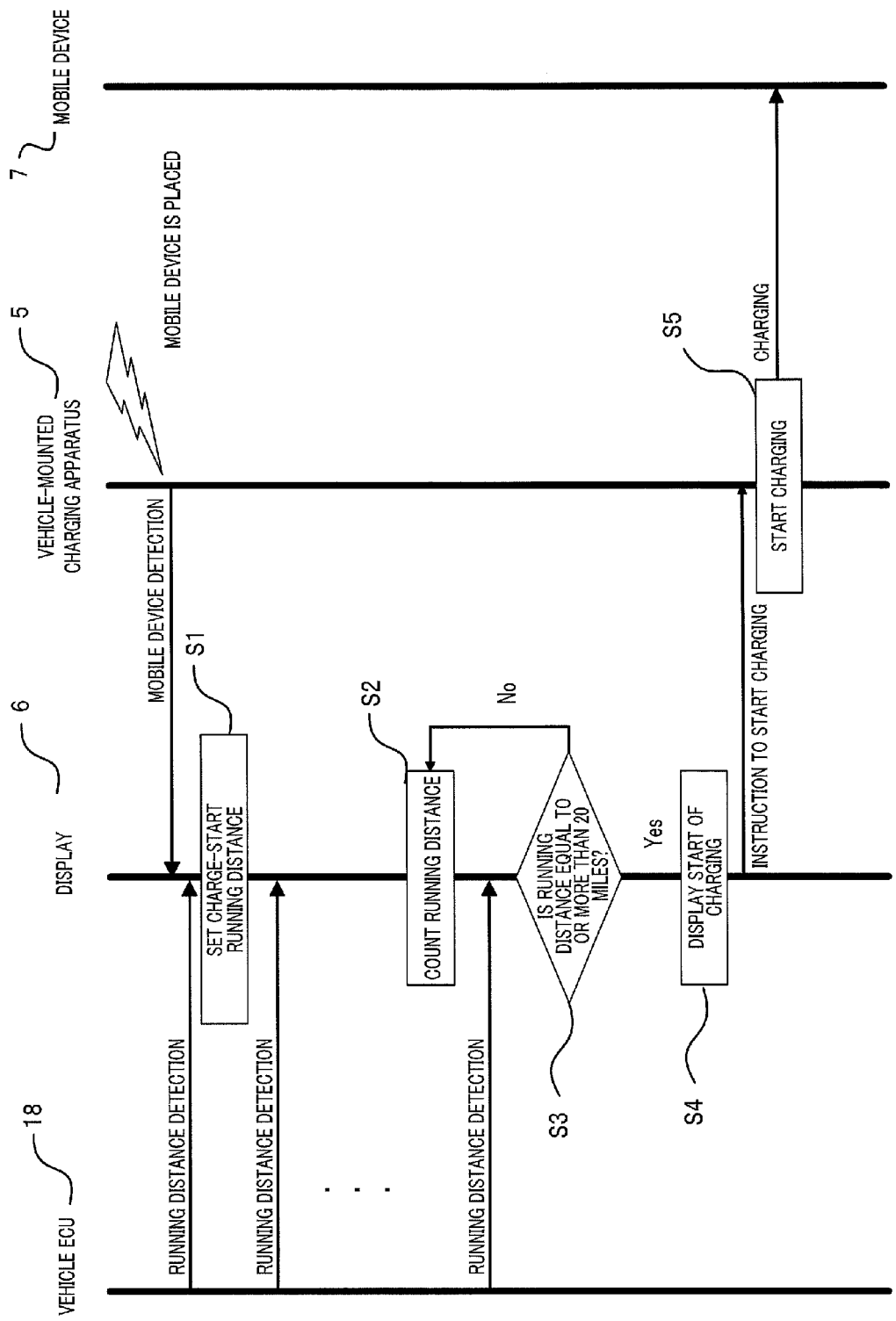
FIG. 8 is a flowchart illustrating operation up to start of charging according to an embodiment of the present invention.

When detecting that charging coil 10 and charging coil 13 are magnetically coupled, charge control section 12 causes control section 15 of display 6 to display the contents of FIG. 5, which are stored in memory 17 (i.e., S1 in FIG. 8).

The display 6 displays key switch 22 for selecting an option to immediately start charging of mobile device 7 and key switch 23 for selecting an option to start charging in accordance with a running distance.

FIG. 5 illustrates an example of a case where the driver selects the option to start charging in accordance with a running distance. In this example, charge control section 12 causes control section 15 of display 6 to display the contents of FIG. 6, which are stored in memory 17.

Figure 6:
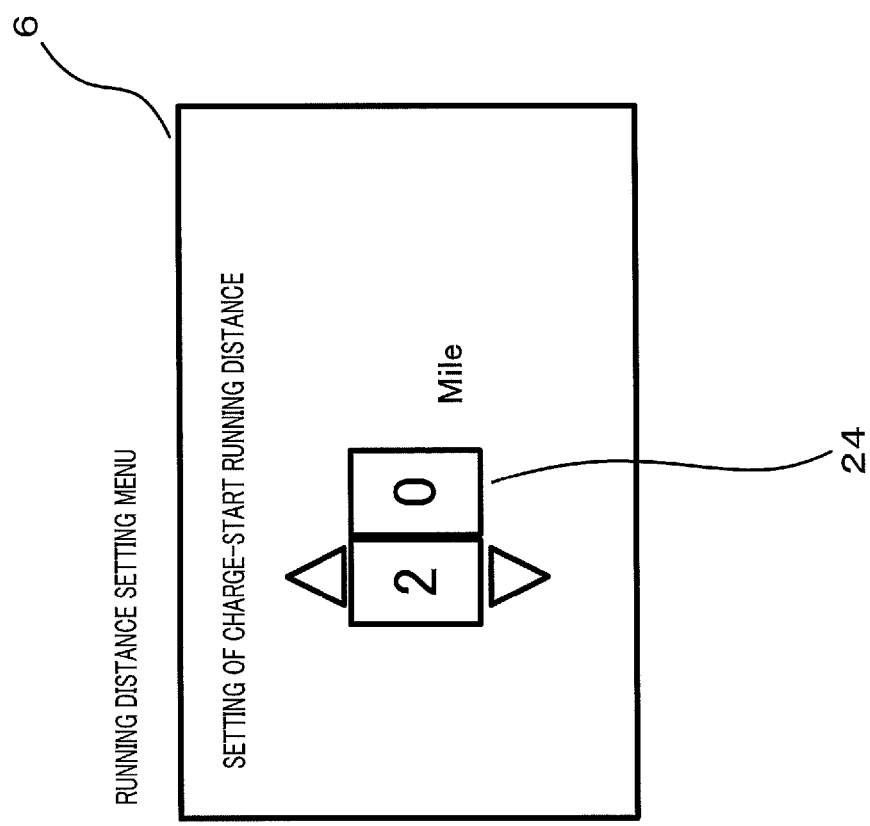
FIG. 6 is another diagram illustrating display contents of a display of a vehicle-mounted charging apparatus according to an embodiment of the present invention.

More specifically, key switch (an example of charge-start setting section) 24 for setting the running distance at which charging starts is displayed. FIG. 6 illustrates an example of a case where the driver sets 20 miles for this running distance.

When the vehicle starts moving after completion of this setting by the driver, the running distance of vehicle 1 is calculated based on the output of vehicle-speed pulse sensor 21. The calculated running distance is always transmitted to charge control section 12 via communication section 19, connection terminal 20, communication section 16 of display 6, and control section 15 (S2 in FIG. 8).

Figure 7:
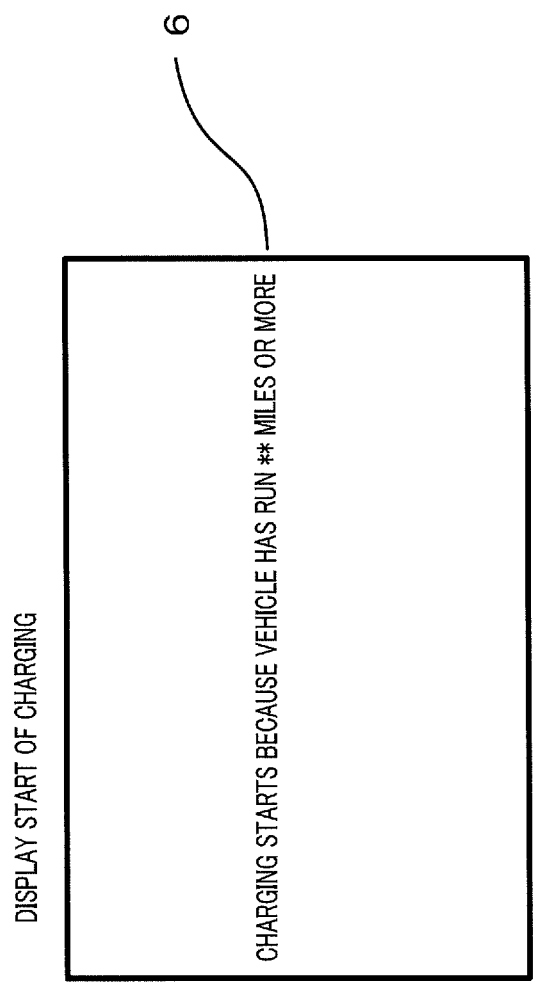
FIG. 7 is still another diagram illustrating display contents of a display of a vehicle-mounted charging apparatus according to an embodiment of the present invention.

When the running distance increases to 20 miles or more (YES in S3 of FIG. 8), charge control section 12 causes control section 15 of display 6 to display the contents of FIG. 7, which are stored in memory 17 (S4 in FIG. 8).

Charge control section 12 drives drive circuit 11 at the same time. Drive circuit 11 excites charge coil 10 to change the magnetic flux generated by charge coil 10 and thereby to supply power from charge coil 10. Thus, charging of mobile device 7 starts (S5 in FIG. 8).

As described above, in this embodiment, drive circuit 11 is configured to be driven after vehicle 1 runs the running distance that is set by key switch 24. Thus, rechargeable battery 9 can be prevented from deteriorating quickly due to unnecessary frequent charging. In addition, according to the present embodiment, it is possible to start charging at an appropriate timing in accordance with the running distance.

Moreover, the driver sets the running distance at which charging starts, while knowing the current driving conditions, so that the driver no longer feels a sense of dissatisfaction caused by insufficient charging.

It should be noted that, the present embodiment has been described with a case where key switches 22, 23, and 24 are touch switches of display 6 as is well known, but the present invention is by no means limited to this case.

The disclosure of Japanese Patent Application Number 2012-037101 filed on Feb. 23, 2012 including the specification, drawings and abstract is incorporated herein by reference in its entirety.

As has been described above, in the present invention, the configuration in which charging starts after the vehicle runs the running distance that is set by the driver is employed. Thus, there is no deterioration of batteries, which would otherwise occur due to unnecessary charging, and it is possible to start charging at an appropriate timing in accordance with the moving distance.

Accordingly, the present invention is expected to be utilized in a vehicle-mounted charging apparatus.

REFERENCE SIGNS LIST

1 Vehicle
2 Vehicle interior
3 Steering wheel
4 Electronic device
5 Vehicle-mounted charging apparatus
6 Display
7 Mobile device (e.g., mobile phone)
8 Charging coil
9 Rechargeable battery
10 Charging coil
11 Drive circuit
12 Charge control section
13 Charging coil
14 Terminal control section
15 Control section
16 Communication section
17 Memory
18 Vehicle ECU
19 Communication section
20 Connection terminal
21 Vehicle-speed pulse sensor
22, 23, 24 Key switch

The invention claimed is:
1. A vehicle-mounted charging apparatus comprising:
a charging coil that is used for charging a mobile device;

a drive circuit that is connected to the charging coil and that is driven to supply power to the mobile device via the charging coil;

a charge control section that is connected to the drive circuit and that controls a timing to start driving the drive circuit; and a charge-start setting section that is connected to the charge control section and that sets a distance at which charging starts, wherein the charge control section drives the drive circuit after a vehicle runs a running distance in a state in which the charging coil and the mobile device are magnetically coupled, the running distance being set by the charge-start setting section.

2. The vehicle-mounted charging apparatus according to claim 1, wherein the charge control section is connected to a vehicle electronic control unit (ECU) that informs a vehicle running distance.

3. The vehicle-mounted charging apparatus according to claim 1, wherein the charge-start setting section includes a touch switch of a display connected to the charge control section.

4. The vehicle-mounted charging apparatus according to claim 3, wherein the charge control section is connected to a vehicle electronic control unit (ECU) via the display.

5. A vehicle comprising the vehicle-mounted charging apparatus according to claim 1.

\* \* \* \* \*